United States Patent
Cho et al.

(10) Patent No.: US 11,625,365 B2
(45) Date of Patent: Apr. 11, 2023

(54) METHOD FOR MANAGING VIRTUAL FILE, APPARATUS FOR THE SAME, COMPUTER PROGRAM FOR THE SAME, AND RECORDING MEDIUM STORING COMPUTER PROGRAM THEREOF

(71) Applicant: Fasoo Co., Ltd, Seoul (KR)

(72) Inventors: Jung Hyun Cho, Seoul (KR); Jeong Moon Oh, Gimpo-si (KR); Byung Joo Lee, Seoul (KR)

(73) Assignee: Fasoo Co., Ltd, Seoul (KR)

( * ) Notice: Subject to any disclaimer, the term of this patent is extended or adjusted under 35 U.S.C. 154(b) by 0 days.

(21) Appl. No.: 17/370,891

(22) Filed: Jul. 8, 2021

(65) Prior Publication Data
US 2022/0043783 A1 Feb. 10, 2022

(30) Foreign Application Priority Data
Aug. 6, 2020 (KR) ........................ 10-2020-0098381

(51) Int. Cl.
*G06F 16/188* (2019.01)
*G06F 16/17* (2019.01)
*G06F 16/16* (2019.01)

(52) U.S. Cl.
CPC .......... *G06F 16/192* (2019.01); *G06F 16/168* (2019.01); *G06F 16/1734* (2019.01)

(58) Field of Classification Search
CPC ... G06F 16/192; G06F 16/168; G06F 16/1734
See application file for complete search history.

(56) References Cited

U.S. PATENT DOCUMENTS

| 2015/0012571 A1* | 1/2015 | Powell | G06F 3/0647 707/827 |
| 2019/0370362 A1* | 12/2019 | Mainali | G06F 16/116 |
| 2021/0096958 A1* | 4/2021 | Kumar | G06F 16/128 |
| 2022/0035574 A1* | 2/2022 | Cain | G06F 3/0611 |

FOREIGN PATENT DOCUMENTS

| JP | 2007164597 A | 6/2007 |
| JP | 2007199763 A | 8/2007 |
| JP | 2008181234 A | 8/2008 |
| JP | 2008226137 A | 9/2008 |
| JP | 5132676 B2 | 1/2013 |
| JP | 6208860 B2 | 10/2017 |

(Continued)

OTHER PUBLICATIONS

Fasoo Co., Ltd., Office Action, Korean Patent Application No. 10-2020-0098381, dated Jan. 14, 2022, 5 pgs.

(Continued)

*Primary Examiner* — James Trujillo
*Assistant Examiner* — Michal Bogacki
(74) *Attorney, Agent, or Firm* — Morgan, Lewis & Bockius LLP

(57) ABSTRACT

The present disclosure provides a virtual file management method and apparatus, and a computer-readable recording medium thereof, which may comprises obtaining an object identifier for distinguishing objects, wherein the object includes at least one of a virtual file or a virtual folder and obtaining the object based on the obtained object identifier.

13 Claims, 11 Drawing Sheets

(56) References Cited

FOREIGN PATENT DOCUMENTS

| | | |
|---|---|---|
| JP | 2020095588 A | 6/2020 |
| KR | 20060007666 A | 1/2006 |
| KR | 20070058517 A | 6/2007 |
| KR | 20100016223 A | 2/2010 |
| KR | 100996763 B1 | 11/2010 |
| KR | 20120018974 A | 3/2012 |
| KR | 101460091 B1 | 11/2014 |
| KR | 101828466 B1 | 2/2018 |
| KR | 2018008770 A | 8/2018 |
| KR | 101903817 B1 | 10/2018 |

OTHER PUBLICATIONS

Fasoo Co. Ltd., KR Notice of Allowance, KR 10-2020-0098381, dated Jul. 19, 2022, 12 Pages.

* cited by examiner

| Object identifier | User identifier list |
|---|---|
| C | A, B |
| C\Temp | A, B |
| C\Temp\Rhapsody | A, D |

# METHOD FOR MANAGING VIRTUAL FILE, APPARATUS FOR THE SAME, COMPUTER PROGRAM FOR THE SAME, AND RECORDING MEDIUM STORING COMPUTER PROGRAM THEREOF

TECHNICAL FIELD

The present disclosure provides a virtual file management method, apparatus, computer program and recording medium thereof for generating a virtual folder screen showing at least one virtual file, and modifying a virtual file requested to be modified based on the generated virtual folder screen among the at least one virtual file.

BACKGROUND ART

Conventionally, in order for a user (a terminal) or a server to access a real file, it has to access a real file stored in a server storage space or access a real file in a user's (terminal) storage space copied from a server.

In the former case, when multiple users (terminals) use a server's storage space, a collision problem may occur between users (terminals) and a server, and an overload problem of a server may also occur.

In the latter case, since a new storage space must be allocated for each user (terminal), a problem of wasted storage space may occur, and a problem that files of each user (terminal) and files of a server cannot be managed uniformly may occur.

In addition, conventionally, when each user (terminal) or server modifies a real file, new files may be generated indiscriminately, resulting in waste of storage space and difficult management.

DISCLOSURE

Technical Problem

Accordingly, in this disclosure, in order to manage files (real files, virtual files), a virtual folder is used to reduce a waste of data storage space, and when a virtual file in a virtual folder is modified, a real file is modified so that the files are managed uniformly.

In addition, since a virtual file and a real file use one unique file identifier, if a virtual file or a real file is modified by a user (terminal) or a server with a permission to modify, by modifying both a virtual file and a real file having the same unique file identifier, it is intended to manage files uniformly and efficiently, and to prevent indiscriminate file generation.

Technical Solution

A virtual file management method and apparatus, and computer-readable recording medium thereof, may comprise obtaining an object identifier for distinguishing objects, wherein the object includes at least one of a virtual file or a virtual folder; and obtaining the object based on the obtained object identifier, wherein the object identifier may be a virtual path of the object having the object identifier.

In a virtual file management method and apparatus, and computer-readable recording medium thereof, when there is no object of a higher structure including the object having the object identifier, the virtual path may be a name of the object having the object identifier.

In a virtual file management method and apparatus, and computer-readable recording medium thereof, when there is an object of a higher structure including the object having the object identifier, the virtual path may include a name of the object having the object identifier, a name of the object of the higher structure, and a relationship between the object having the object identifier and the object of the higher structure.

In a virtual file management method and apparatus, and computer-readable recording medium thereof, generating a virtual folder screen based on the obtained object and modifying a virtual file requested to be modified based on the generated virtual folder screen may be further included.

In a virtual file management method and apparatus, and computer-readable recording medium thereof, the virtual file modification step may further comprise modifying a real file or a virtual file having the same file unique identifier as the virtual file requested to be modified to be the same as the virtual file requested to be modified.

In a virtual file management method and apparatus, and computer-readable recording medium thereof, the virtual file modification step may further comprise changing a file unique identifier of the virtual file requested to be modified into a file unique identifier different from the file unique identifier.

In a virtual file management method and apparatus, and computer-readable recording medium thereof, a virtual folder modification step of modifying a virtual folder including the virtual file requested to be modified may be further included.

Technical Effects

In the present disclosure, by providing document sharing between multiple users using virtual folders and virtual files, document access may be uniformly managed without additional document management processes such as new generation or version management of shared documents for individual users. Changes in the document are saved in a real file, and a user may check the changes in real time even through a virtual file.

In the present disclosure, a document security function is strengthened by fundamentally blocking an access of an unauthorized user by configuring an interface of a virtual folder and virtual file restrictively according to a usage permission of an individual user and storing a change time of a real document together with a user identifier at the same time.

In the present disclosure, by using a virtual file including a unique file identifier, it is possible to prevent indiscriminate generation of a real file when sharing a document, and to efficiently manage a physical storage space.

DESCRIPTION OF DIAGRAMS

MODE FOR INVENTION

Figure 1:
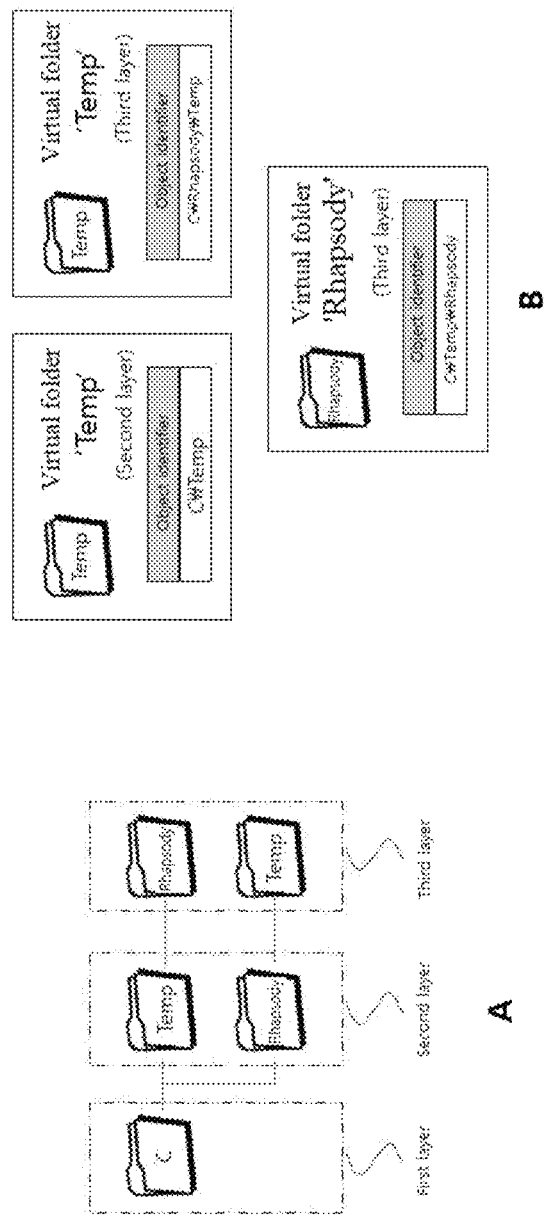
FIG. 1 is a diagram showing a first embodiment of a virtual folder and a virtual folder object identifier.

Hereinafter, with reference to the accompanying drawings, embodiments of the present disclosure will be described in detail so that those of ordinary skill in the art to which the present disclosure pertains can easily implement them. However, the present disclosure may be embodied in several different forms and is not limited to the embodiments described herein.

In describing an embodiment of the present disclosure, if it is determined that a detailed description of a known configuration or function may obscure a gist of the present disclosure, a detailed description thereof will be omitted. In addition, in the drawings, parts not related to a description of the present disclosure are omitted, and similar reference numerals are attached to similar parts.

In the present disclosure, when a component is said to be "connected", "coupled" or "linked" with another component, it may include not only a direct connection relationship, but also an indirect connection relationship in which another component exists in the middle. In addition, when it is said that a component "includes" or "has" another component, it means that another component may be further included without excluding other components unless otherwise stated.

In the present disclosure, terms such as first and second are used only for the purpose of distinguishing one component from other components, and unless otherwise specified, an order or importance between the components is not limited. Accordingly, within the scope of the present disclosure, a first component in one embodiment may be referred to as a second component in another embodiment, and similarly, a second component in one embodiment may be referred to as a first component in another embodiment.

In the present disclosure, components distinct from each other are for clearly describing respective characteristics, and do not necessarily mean that the components are separated. In other words, a plurality of components may be integrated to form one hardware or software unit, or one component may be distributed to form a plurality of hardware or software units. Accordingly, even if not specifically mentioned, such integrated or dispersed embodiments are also included in the scope of the present disclosure.

In the present disclosure, components described in various embodiments do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

1. Definition of the Concept (1) Real file, Virtual file, Virtual folder

A real file may include a file stored in a physical location of a storage space such as a real server, terminal, or system.

A virtual file may be a file that is not allocated a real physical space, may be stored in a virtual folder, and may be linked to a real file. With respect to the above link, one real file may be linked to one or more virtual files.

A virtual folder may not be assigned to a real physical space, may contain other virtual folders (e.g., virtual folders in a sub-structure (or lower layer)) or virtual files, and may be a space that can perform various functions such as sharing, manipulating, or searching for other virtual folders or virtual files within the virtual folder.

(2) File Unique Identifier

A file unique identifier may be an identifier for distinguishing a real file. In addition, a file unique identifier may be key data of a database. In other words, data (e.g., a user identifier list) regarding a corresponding real file may be obtained from a database using a unique file identifier.

A file unique identifier may be stored in a file or stored in a database. When stored in the database, a file may store information indicating a file unique identifier. In this case, a file unique identifier may be obtained from a database using information indicating a file unique identifier.

A file unique identifier may be generated when generating a real file. In addition, a file unique identifier may be selectively generated differently from a previous file unique identifier when a real file or virtual file is copied, moved, or changed.

A unique file identifier may include various information (type, generation date, author, etc.) about a real file. For example, when a unique file identifier is P20200714FASOO, P may indicate that a type of a real file is a PDF file, 20200714 may indicate that a generation date is 2020-07-14, and FASOO may indicate that an author is FASOO. As such, if a file unique identifier of a real file contains information of a real file, since the information of the file may be obtained directly from a unique file identifier, a process of retrieving data about a real file from a database for obtaining the information of the file may be omitted.

However, if a unique file identifier contains various information about a real file, a security problem may arise. Accordingly, the security problem may be supplemented by controlling access to a file unique identifier that is not allowed, or by encrypting a file unique identifier when there is access to a file unique identifier that is not allowed.

As an example, a user (or terminal) having a user identifier that is not included in a user list linked to a file unique identifier does not have access permission to the file unique identifier, or the file unique identifier may be displayed in an encrypted state.

(3) Object Identifier

An object identifier may be an identifier for identifying an object. Herein, an object may include a virtual folder and a virtual file. An object identifier may be key data of a database. In other words, data about a corresponding object may be obtained from a database using an object identifier.

An object identifier may be stored in an object or stored in a database. When stored in the database, an object may store information indicating an object identifier. In this case, an object identifier may be obtained from a database using information indicating an object identifier.

An object identifier may be generated when generating an object. In addition, an object identifier may be generated differently from a previous object identifier when an object is copied, moved, or changed.

FIG. 1 is a diagram showing a first embodiment of a virtual folder and a virtual folder object identifier.

Referring to FIG. 1A, a virtual folder may have a structure (or layer). There may be a virtual folder 'C' in a first layer, there may be virtual folders 'Temp' and 'Rhapsody' belonging to virtual folder 'C' in a second layer, and there may be a virtual folder 'Rhapsody' belonging to the virtual folder 'Temp' of the second layer and a virtual folder 'Temp' belonging to the virtual folder 'Rhapsody' of the second layer in the third layer.

In a first embodiment, an object identifier may include one element constituting the object identifier. In addition, an object identifier may include a plurality of elements constituting the object identifier and a relationship between the plurality of the elements. Herein, the elements may include a name of an object (first object) having the object identifier, and when there are a plurality of elements constituting the object identifier, it may further include a name of an object (second object) of a higher structure (or layer) including the object (first object) is additionally included, and the relationship may be determined based on the structure (or layer) of the objects (the first object and the second object). Herein, a range of a higher structure may include an immediately higher structure or all higher structures.

Referring to FIG. 1B, in the case of a virtual folder 'Temp' of a second layer, elements constituting the object identifier of the virtual folder may include a name 'Temp' of the virtual folder and a name 'C' of a virtual folder of an higher layer including the virtual folder. In this case, a relationship between the elements may be determined based on a relationship between a virtual folder 'C' and a virtual folder 'Temp' (a virtual folder 'Temp' is a virtual folder of a lower layer belonging to the virtual folder 'C'). Accordingly, an object identifier of a virtual folder 'Temp' of a second layer may be 'Temp'.

On the other hand, in the case of a virtual folder 'Temp' of a third layer, elements constituting the object identifier of the virtual folder may include a name 'Temp' of the virtual folder and names 'C' and 'Rhapsody' of a virtual folder of an higher layer including the virtual folder. In this case, a relationship between the elements may be determined based on a relationship between virtual folders 'C' and 'Rhapsody' and a virtual folder 'Temp' (a virtual folder 'Temp' is a virtual folder in a lower layer belonging to a virtual folder 'Rhapsody' of a second layer, and a virtual folder 'Rhapsody' of a second layer is a virtual folder of a lower layer belonging to a virtual folder 'C' of a first layer). Accordingly, an object identifier of a virtual folder 'Temp' of a third layer may be 'C\Rhapsody\Temp'.

Figure 2:
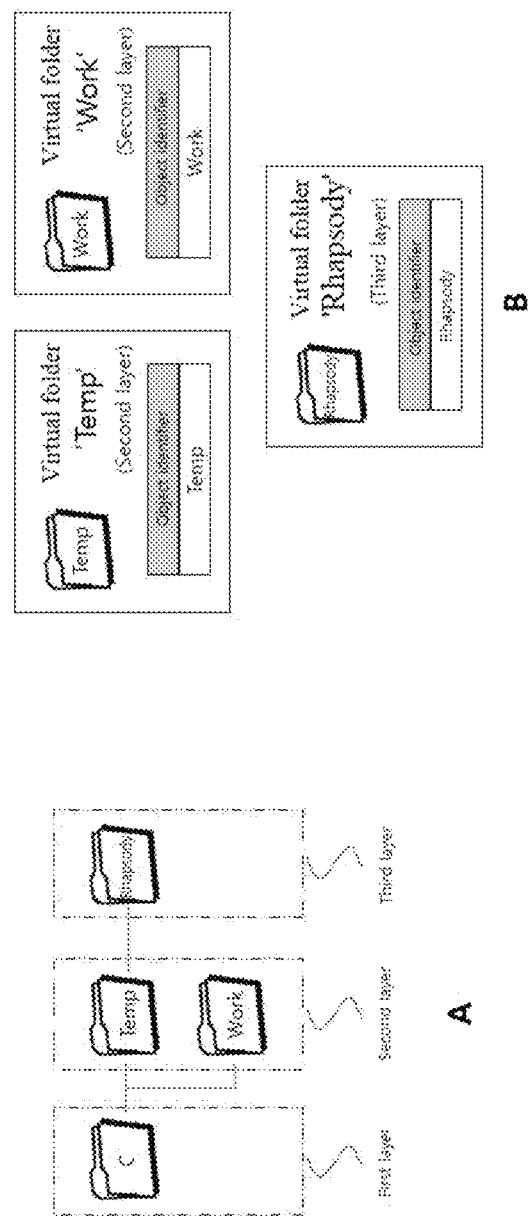
FIG. 2 is a diagram showing a second embodiment of a virtual folder and a virtual folder object identifier.

FIG. 2 is a diagram showing a second embodiment of a virtual folder and a virtual folder object identifier.

Referring to FIG. 2A, a virtual folder may have a structure (or layer). There may be a virtual folder 'C' in a first layer, there may be virtual folders 'Temp' and 'Work' belonging to virtual folder 'C' in a second layer, and there may be a virtual folder 'Rhapsody' belonging to a virtual folder 'Temp' of a second layer in a third layer.

In a second embodiment, an object identifier may include one element constituting the object identifier. Herein, the element may include a name of an object having the object identifier. Herein, the name of the object may not be duplicated with a name of another object. In other words, since each name of objects (virtual folders and virtual files) is different from each other, each object may be distinguished by using an object identifier including one element of an object identifier.

Referring to FIG. 2B, in the case of a virtual folder 'Temp' of a second layer, elements constituting an object identifier of the virtual folder may include a name 'Temp' of the virtual folder. In this case, since a relationship between the elements and other elements is not considered, an object identifier of a virtual folder 'Temp' of a second layer may be 'C\Temp'.

In the case of a virtual folder 'Rhapsody' of a third layer, elements constituting an object identifier of the virtual folder may include a name 'Rhapsody' of the virtual folder. In this case, since a relationship between the elements and other elements is not considered, an object identifier of the virtual folder 'Rhapsody' of the third layer may be 'Rhapsody'.

Hereinafter, for convenience of description, a case of an object identifier of the first embodiment will be described as a reference. However, this may also be applied to an object identifier of the second embodiment.

(4) Relationship Between a File Unique Identifier and an Object Identifier

An object identifier may include an object identifier of a virtual folder and an object identifier of a virtual file.

An object identifier of a virtual file may be linked to a unique file identifier of a real file corresponding to a virtual file through a database. As a result, a virtual file may be linked to a real file.

In addition, one file unique identifier may be linked to object identifiers of a plurality of virtual files through a database. As a result, one real file may be linked to a plurality of virtual files.

Therefore, when a virtual file is modified, other virtual files and real files linked through a virtual file and a file unique identifier may be modified. Similarly, when a real file is modified, all virtual files linked to a real file may be modified.

(5) User Identifier

It may be an identifier to distinguish a user (terminal) or a server. In addition, a user identifier may be key data of a database. In other words, data about a corresponding user (terminal) or server may be obtained from a database using a user identifier.

A user identifier may be stored in a user (terminal) or a server, or may be stored in a database. When stored in the database, a user (terminal) or a server may store information indicating a user identifier. In this case, a user identifier may be obtained from a database using information indicating a user identifier.

A user identifier may be generated when registering a user (terminal) or a server.

A user identifier may include various information (IP, network, user authority level, etc.) about a user (terminal) or a server. For example, when a user identifier is 1-123123123123-A, it may indicate that a user (terminal) or a server belongs to the first network, has IP 123.123.123.123, and has a user authority level of A. As such, when a user identifier of a user (terminal) or a server includes information of a user (terminal) or a server, since the information on the user (terminal) or the server may be obtained directly from a user identifier, a process of retrieving data about the user (terminal) or the server from a database for obtaining the information about the user (terminal) or the server may be omitted.

However, if a user identifier contains various information, problems such as personal information leakage may occur. Accordingly, the above problem may be supplemented by controlling access to an unauthorized user identifier, or by encrypting a user identifier when there is access to an unauthorized user identifier.

(6) User Identifier List

A user identifier list may be linked to a file unique identifier or an object identifier.

The link may include a case in which a user identifier list is directly included in a file unique identifier or an object identifier to be linked. In addition, the link may include a case in which a file unique identifier or an object identifier is indirectly linked to a user identifier list through a database.

A user identifier list linked to a file unique identifier may be a factor determining a read/write permission of a real file having a file unique identifier linked to a corresponding user identifier list or a virtual file linked to the file unique identifier.

A user identifier list linked to an object identifier may be a factor determining a read/write permission of an object having the object identifier linked to the user identifier list.

In addition, using a user identifier list, a user identifier may be linked to a file unique identifier or an object identifier through a database. For example, when a user identifier is A, since a user identifier list is linked to a file unique identifier or object identifier, a user identifier A may be linked to a file unique identifier or object identifier having a user identifier list including A.

(7) Read/Write Permission

Permissions may include a read permission, a write permission and a read and write permission. For example, a user (terminal) or a server with a read permission can read only a permission target, and a user (terminal) or a server with a write permission can write only a permission target.

In the present disclosure, for convenience of description, including at least one of read or write is expressed as 'read/write'. Accordingly, a read/write permission may refer to having at least one of a read permission or a write permission.

A read/write permission may be determined by a user identifier list.

When a user identifier of a user (terminal) or a server is included in a user identifier list of an object identifier of a virtual folder, the user (terminal) or the server may have a read/write permission of the virtual folder including the object identifier.

Figure 3:
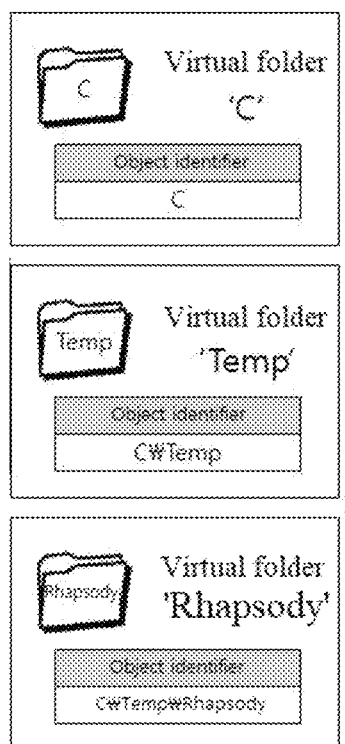
FIG. 3 shows an example of a user identifier list linked to an object identifier of a virtual folder.

FIG. 3 shows an example of a user identifier list linked to an object identifier of a virtual folder.

Referring to FIG. 3, an object identifier of a virtual folder 'C' may be 'C', an object identifier of a virtual folder 'Temp' may be 'C\Temp, and an object identifier of a virtual folder 'Rhapsody' may be 'C\Temp\Rhapsody. In addition, a user identifier list of an object identifier 'C' may have two user identifiers 'A' and 'B', a user identifier list of an object identifier 'C\Temp' may have two user identifiers 'A' and 'B', and a user identifier list of an object identifier 'C\Temp\Rhapsody' may have two user identifiers 'A' and 'D'.

In a first embodiment, when a user identifier of a user (terminal) or a server is included in a user identifier list of an object identifier, the user (terminal) or the server may have a read/write permission of an object having the object identifier.

Referring to FIG. 3, since a user identifier 'A' is included in a user identifier list of object identifiers 'C', 'C\Temp', and 'C\Temp\Rhapsody', a user (terminal) or a server having a user identifier 'A' may have a read/write permission of virtual folders 'C', 'Temp', and 'Rhapsody' having each of the object identifiers.

On the other hand, since a user identifier 'B' is included only in user identifier lists of object identifiers 'C' and 'C\Temp', a user (terminal) or a server having a user identifier 'B' has a read/write permission of a virtual folder 'C' having the object identifier 'C' and a virtual folder 'Temp' having the object identifier 'C\Temp', but does not have a read/write permission of a virtual folder 'Rhapsody' having the object identifier 'C\Temp\Rhapsody'.

In a second embodiment, when a user identifier of a user (terminal) or a server is included in a user identifier list of an object identifier, the user (terminal) or the server may have a read/write permission of an object having the object identifier and an object in a higher structure (or layer) of the object on a virtual path.

Referring to FIG. 3, a user (terminal) or a server having a user identifier 'D' may have a read/write permission of a virtual folder 'Rhapsody' having an object identifier 'C\Temp\Rhapsody' as well as may also have a read/write permission of virtual folders 'C' and 'Temp' in a higher structure (or layer) of an object having the object identifier 'C\Temp\Rhapsody' on a virtual path.

In a third embodiment, only when a user identifier of a user (terminal) or a server is included in a user identifier list of a first object identifier and the user identifier is included in an object identifier list of a second object identifier of a virtual folder in a higher structure (or layer) of an object having the first object identifier on a virtual path, the user (terminal) or the server may have a read/write permission of the object having the first object identifier. Herein, a range of a higher structure may include an immediately higher structure or all higher structures.

Referring to FIG. 3, since there is a user identifier 'D' in a user list of an object identifier 'C\Temp\Rhapsody', but there is no user identifier 'D' in a identifier list linked to virtual folders 'C' and 'Temp' of a higher structure (or layer) of a virtual folder 'Rhapsody' having an object identifier 'C\Temp\Rhapsody', a user (terminal) or a server having the user identifier 'D' may not have a read/write permission of a virtual folder 'Rhapsody' having an object identifier 'C\Temp\Rhapsody'.

On the contrary, since there is a user identifier 'A' in a user list of an object identifier 'C\Temp\Rhapsody', and there is a user identifier 'A' in a identifier list linked to virtual folders 'C' and 'Temp' in a higher structure (or layer) of a virtual folder 'Rhapsody' having an object identifier 'C\Temp\Rhapsody', a user (terminal) or a server having the user identifier 'A' may have a read/write permission of an virtual folder 'Rhapsody' having an object identifier 'C\Temp\Rhapsody'.

Reading/writing of a real file may be performed through reading/writing of a real file. In addition, reading/writing of a real file may be performed through reading/writing of a virtual file that is linked with the same file identifier as the real file.

Figure 4:
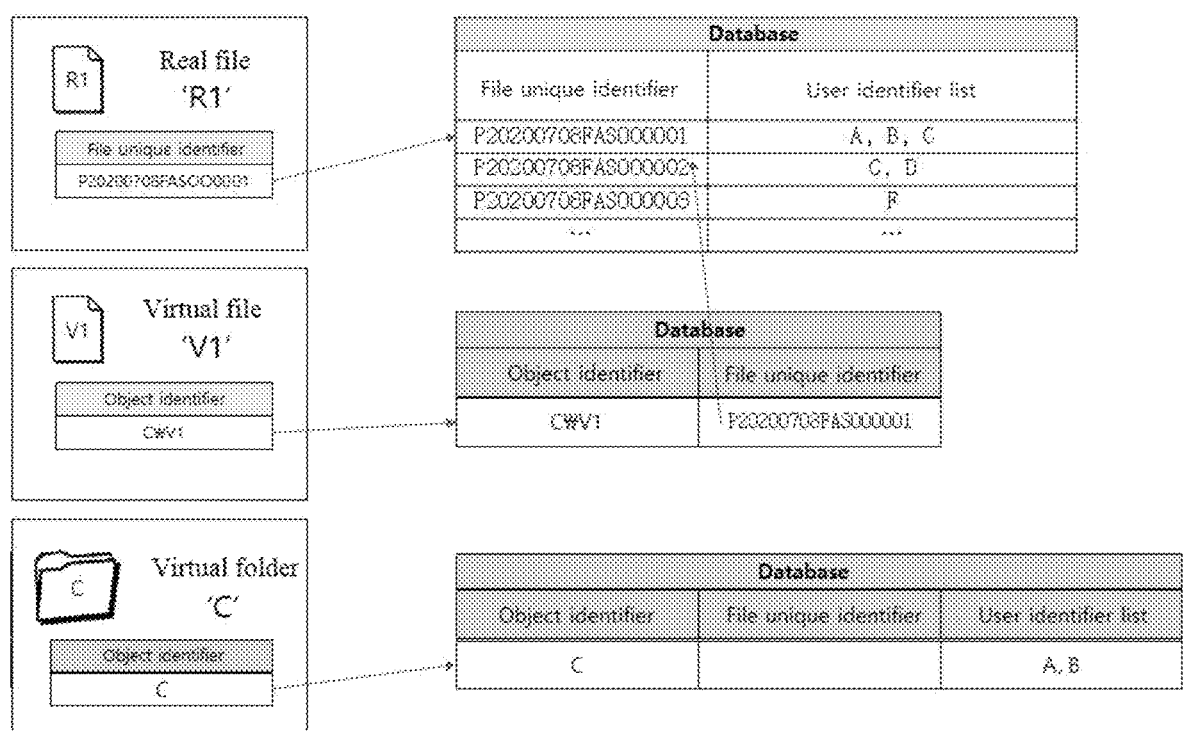
FIG. 4 shows an example of a user identifier list linked to an object identifier of a virtual file and a user identifier list linked to a file unique identifier of a real file.

FIG. 4 shows an example of a user identifier list linked to an object identifier of a virtual file and a user identifier list linked to a file unique identifier of a real file.

When a user identifier of a user (terminal) or a server is included in a user identifier list of a file unique identifier, the user (terminal) or the server may have a read/write permission of a real file having the file unique identifier or a virtual file linked to the file unique identifier.

Referring to FIG. 4, a user (terminal) or a server having user identifiers 'A', 'B', and 'C' may have a read/write permission of a real file 'R1'.

A read/write permission of a virtual file may be divided into a following two embodiments.

In a first embodiment, a user (terminal) or a server having a read/write permission of a real file linked to a virtual file may have a read/write permission on the virtual file.

Referring to FIG. 4, since a read/write permission of a real file 'R1' is possessed by a user (terminal) or a server having user identifiers 'A', 'B', and 'C', a user (terminal) or a server having user identifiers 'A', 'B', and 'C' may also have a read/write permission of a virtual file 'V1'.

In a second embodiment, when it has a read/write permission of a real file linked to a virtual file and a read/write permission of a virtual folder that is a higher structure of the virtual file on a virtual path, it may have a read/write permission of the virtual file. Herein, a range of a higher structure may include an immediately higher structure or all higher structures.

Referring to FIG. 4, a user (terminal) or a server having user identifiers 'A', 'B', and 'C' may have a read/write permission of a real file 'R1'. However, since there is no user identifier 'C' in a user identifier list linked to an object identifier 'C' of a virtual folder 'C', which is a higher structure of a virtual file 'V1', a user (terminal) or a server having a user identifier 'C' may not have a read/write permission of a virtual folder 'V1'. On the other hand, since there are user identifiers 'A' and 'B' in a user identifier list linked to an object identifier 'C' of a virtual folder 'C', which is a higher structure of a virtual file 'V1', a user (terminal) or a server having user identifiers 'A' and 'B' may have a read/write permission of a virtual folder 'V1'.

All or part of real files may not have a linked user identifier list. In this case, all users (terminals) or servers may have read/write permissions of real files. In other words, there may be no limit on a read/write permission. This is equally applicable to virtual files and virtual folders.

A server may have a read/write permission of at least one of a real file, a virtual file, or a virtual folder regardless of a user identifier list. In other words, even if there is no user identifier of a server in a user identifier list, a server may have a read/write permission to at least one of a linked real file, virtual file, or virtual folder. This may be equally applied to a specific user (terminal) according to a setting.

(8) Screen (View) of a Virtual Folder

A form in which a virtual folder is displayed may be a screen (view) of a virtual folder. A screen of a virtual folder may be different according to a screen setting.

A screen setting may include a number limit, the number displayed on one page, a shape, a type, a display format (type, number, etc. of linked metadata information to be displayed), a structure, etc. of at least one of a virtual folder or a virtual file.

Screen settings may be different for each user (terminal) or server.

Screen settings of all or part of network-connected servers and users (terminals) may be the same.

As an example, all of network-connected servers and users (terminals) may use the same screen setting. In this case, for a change of the screen setting, it may include a case where it is possible only in a server, a case in which it is possible only in an authorized server or user (terminal), and a case in which it is possible in all servers or users (terminal).

As an example, screen settings of a server and a user (terminal) belonging to a divided network by dividing a network may be the same. Specifically, when a network is divided into a first network and a second network, a server and a user (terminal) belonging to a first network may have a first screen setting, and a server and a user (terminal) belonging to a second network may have a second screen setting.

2. Virtual File Management Method

Figure 5:
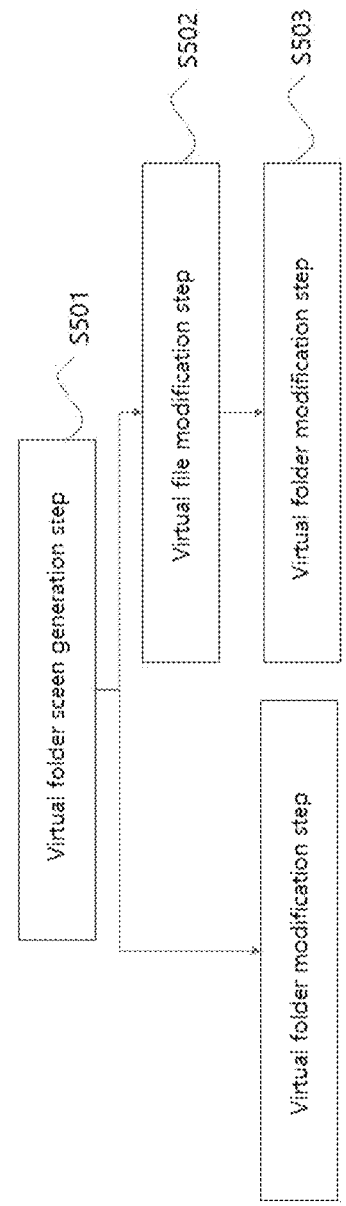
FIG. 5 is a diagram illustrating a virtual file management method.

FIG. 5 is a diagram illustrating a virtual file management method.

Referring to FIG. 5, a virtual file management method may include at least one of a virtual folder screen generation step (S501), a virtual file modification step (S502), or a virtual folder modification step (S503).

1) Virtual Folder Screen Generation Step

Figure 6:
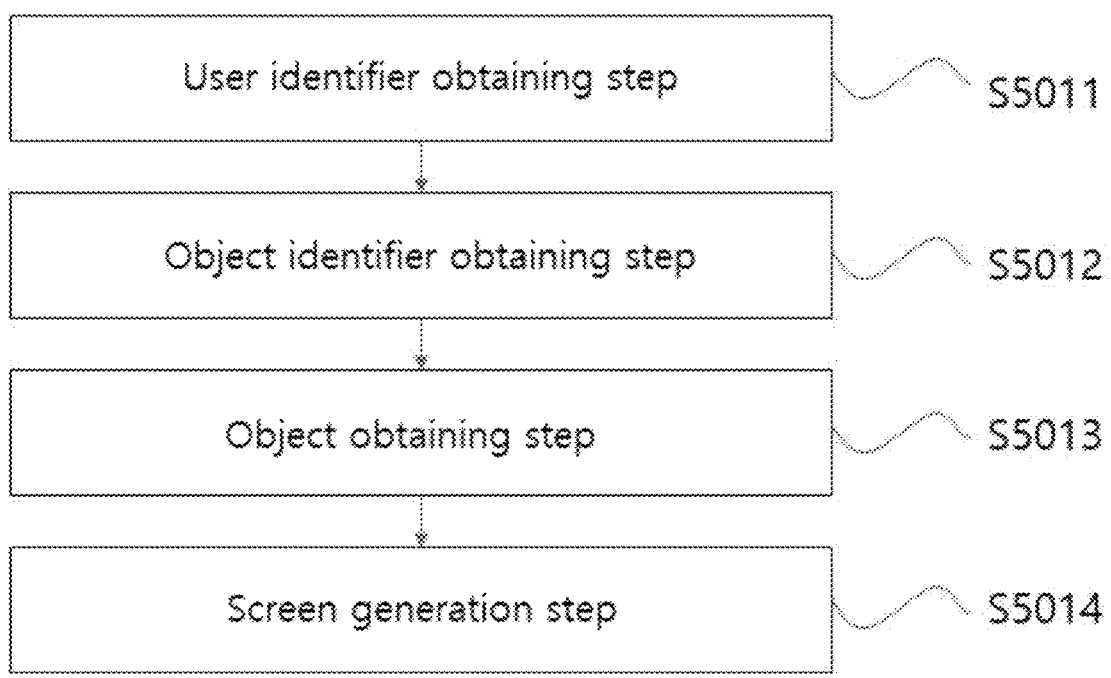
FIG. 6 is a diagram illustrating a virtual folder screen generation step.

FIG. 6 is a diagram illustrating a virtual folder screen generation step.

Referring to FIG. 6, a virtual folder screen generation step (S501) may include at least one of a user identifier obtaining step (S5011), an object identifier obtaining step (S5012), an object obtaining step S5013, or a screen generation step (S5014).

(1) User Identifier Obtaining Step

In a user identifier obtaining step (S5011), user identifier information may be obtained from a user (terminal) or a server. User identifier information may be a user identifier or information for obtaining a user identifier from a database. In the latter case, a user identifier may be obtained from a database using user identifier information and a query.

(2) Object Identifier Obtaining Step

In an object identifier obtaining step (S5012), an object identifier may be obtained from a database by using an obtained user identifier and a query. Specifically, when a user identifier included in a user identifier list of an object identifier and an obtained user identifier are compared and the same, the object identifier may be obtained.

For example, it may assumed that an obtained user identifier is A, there are three object identifiers 'C\Temp', 'C\Temp\Rhapsody' and 'C\Work', and there is a user identifier 'A' only in user identifier lists of 'Temp' and 'C\Temp\Rhapsody' among the object identifiers. In this case, when comparing an obtained user identifier 'A' with a user identifier included in a user identifier list of each object identifier, object identifiers 'C\Temp' and 'C\Temp\Rhapsody' having user identifier 'A' in a user identifier list may be obtained. An object identifier 'C\Work' may not be obtained because a user identifier 'A' is not included in a user identifier list.

(3) Object Obtaining Step

In an object (virtual folder or virtual file) obtaining step (S5013), an object may be obtained from a database by using an obtained object identifier and a query. Specifically, when an object identifier of an object (virtual folder or virtual file) and an obtained object identifier are compared and the same, a corresponding virtual folder or virtual file may be obtained.

(4) Screen Generation Step

In a screen generation step (S5015), a screen of a virtual folder may be generated according to a screen setting based on at least one obtained object (virtual folder or virtual file).

A screen of a virtual folder may be different depending on a screen setting.

A screen setting may include a number limit, the number displayed on one page, a shape, a type, a display format, a structure (or layer), etc. of at least one of a virtual folder or a virtual file.

For a screen of a virtual folder, there may be a case where it is generated in consideration of a structure (or layer) between virtual folders, and there may be case where it is not.

Figure 7:
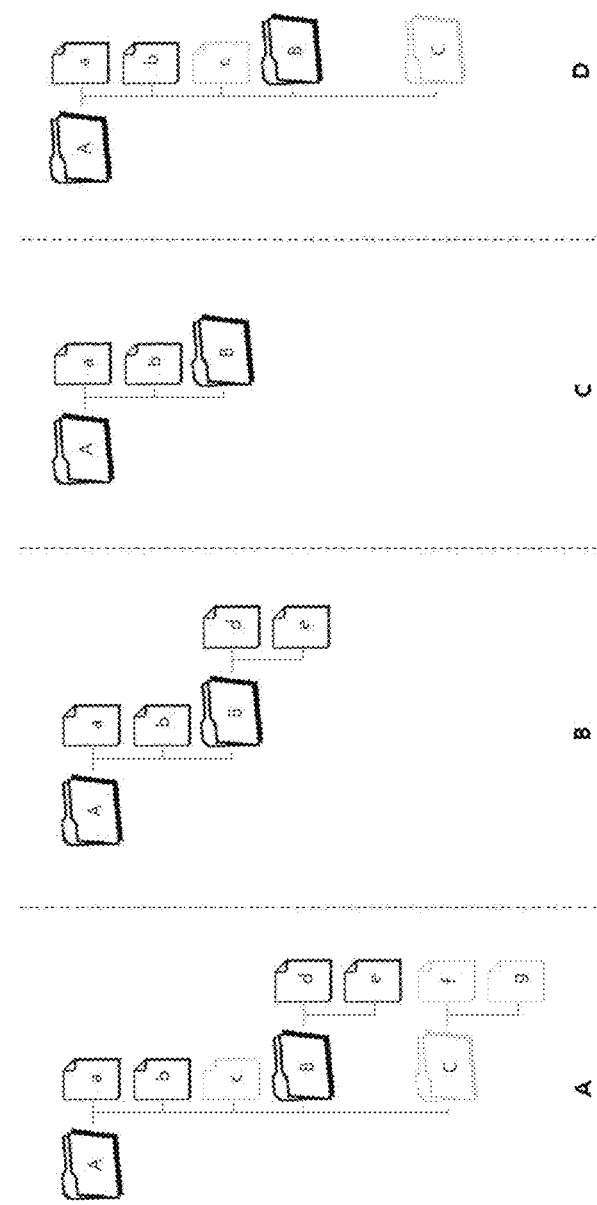
FIG. 7 shows an example of a screen of a virtual folder to be generated in consideration of a structure between virtual folders.

FIG. 7 shows an example of a screen of a virtual folder to be generated in consideration of a structure between virtual folders.

As shown in FIG. 7A, in the following, it is assumed that virtual folders {A, B} and virtual files {a, b, d, e} are obtained through object identifiers, a virtual folder {C} and virtual files {c, f, g} are not obtained through object identifiers, and virtual folders {B, C} are virtual folders belonging to a sub-structure of virtual folder A, an embodiment of a virtual folder screen for a virtual folder A will be described.

In a first embodiment, a screen of a virtual folder is generated by considering a structure between virtual folders, virtual folders and virtual files corresponding to all sub-structures of a corresponding virtual folder may be expressed, and the expressed virtual folders and virtual files may be a form that is limited to a virtual folder and a virtual filed which are obtained by an object identifier or the like. Referring to FIG. 7B, on a screen of a virtual folder A, a virtual folder {B} and virtual files {a, b, d, e} may be expressed because they are obtained by object identifiers, but a virtual folder {C} and virtual files {c, f, g} may not be expressed because they are not obtained by object identifiers or the like.

In a second embodiment, a screen of a virtual folder may be generated by considering a structure between virtual folders, virtual folders and virtual files corresponding to a sub-structure immediately following a corresponding virtual folder may be expressed, and the expressed virtual folders and virtual files may be a form that is limited to a virtual folder and a virtual file which are obtained by an object identifier or the like. Referring to FIG. 7C, on a screen of a virtual folder A, a virtual folder {B} and virtual files {a, b} may be expressed because they are obtained by object identifiers, a virtual folder {C} and virtual files {c, f, g} may not be expressed because they are not obtained by object identifiers, and virtual files {d, e} may not be expressed because they are not sub-structure immediately following a virtual folder A.

In a third embodiment, a screen of a virtual folder may be generated by considering a structure between virtual folders, virtual folders and virtual files corresponding to all sub-structures of a corresponding virtual folder may be expressed, and the expressed virtual folders and virtual files may be a form (a form in which all virtual folders and virtual files are displayed) that is not limited to a virtual folder and a virtual file which are obtained by an object identifier or the like. In this case, a screen of a virtual folder A may be expressed as shown in FIG. 7A. In other words, on a screen of a virtual folder A, virtual folders {B, C} and virtual files {a, b, c, d, e, f, g} may be expressed because they are sub-structures of a virtual folder A.

In a forth embodiment, a screen of a virtual folder may be generated by considering a structure between virtual folders, virtual folders and virtual files corresponding to a sub-structure immediately following a corresponding virtual folder may be expressed, and the expressed virtual folders and virtual files may be a form (a form in which all virtual folders and virtual files are displayed) that is not limited to a virtual folder and a virtual file which are obtained by an object identifier or the like. Referring to FIG. 7D, on a screen of a virtual folder A, virtual folders {B, C} and virtual files {a, b, c} may be expressed because they are sub-structures immediately following a virtual folder A, but virtual files {d, e, f, g} may not be expressed because they are not sub-structures immediately following a virtual folder A.

Figure 8:
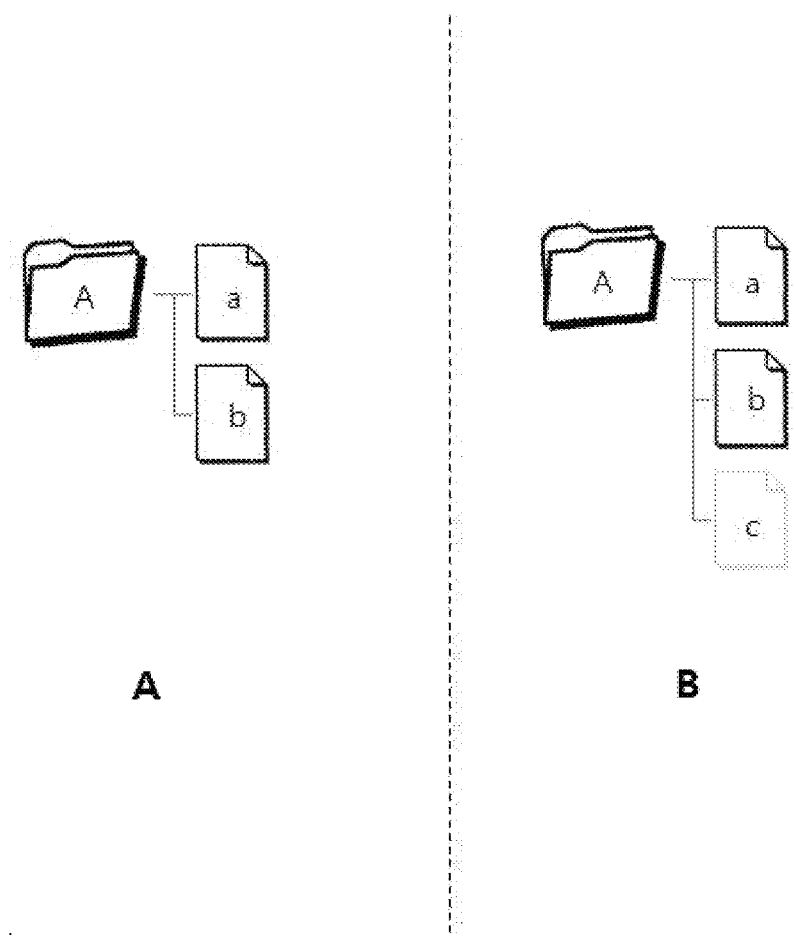
FIG. 8 shows an example of a screen of a virtual folder to be generated without considering a structure between virtual folders.

FIG. 8 shows an example of a screen of a virtual folder to be generated without considering a structure between virtual folders.

Since a structure between virtual folders is not considered, on a screen of a virtual folder, a sub-virtual folder may not be displayed, but only a virtual file may be expressed.

In a fifth embodiment, a screen of a virtual folder may be generated without considering a structure between virtual folders, a virtual file included in a corresponding virtual folder may be expressed, and the expressed virtual file may be a form that is limited to a virtual folder and a virtual file which are obtained by an object identifier or the like. Referring to FIG. 8A, on a screen of a virtual folder A, virtual folders {B, C} and virtual files {c, d} of virtual folders B and C may not be expressed because a structure of a virtual folder is not considered, a virtual file {c} that is not obtained with an object identifier, etc. may not be expressed, and only virtual files {a, b} may be represented.

In a sixth embodiment, a screen of a virtual folder may be generated without considering a structure between virtual folders, a virtual file included in a corresponding virtual folder may be expressed, and the expressed virtual file may be a form (a form in which all virtual files are displayed) that is not limited to a virtual folder and a virtual file which are obtained by an object identifier or the like. Referring to FIG. 8B, on a screen of a virtual folder A, virtual folders {B, C} and virtual files {c, d} of virtual folders B and C may not be expressed because a structure of a virtual folder is not considered, and only virtual files {a, b, c} may be expressed.

2) Virtual File Modification Step

Figure 9:
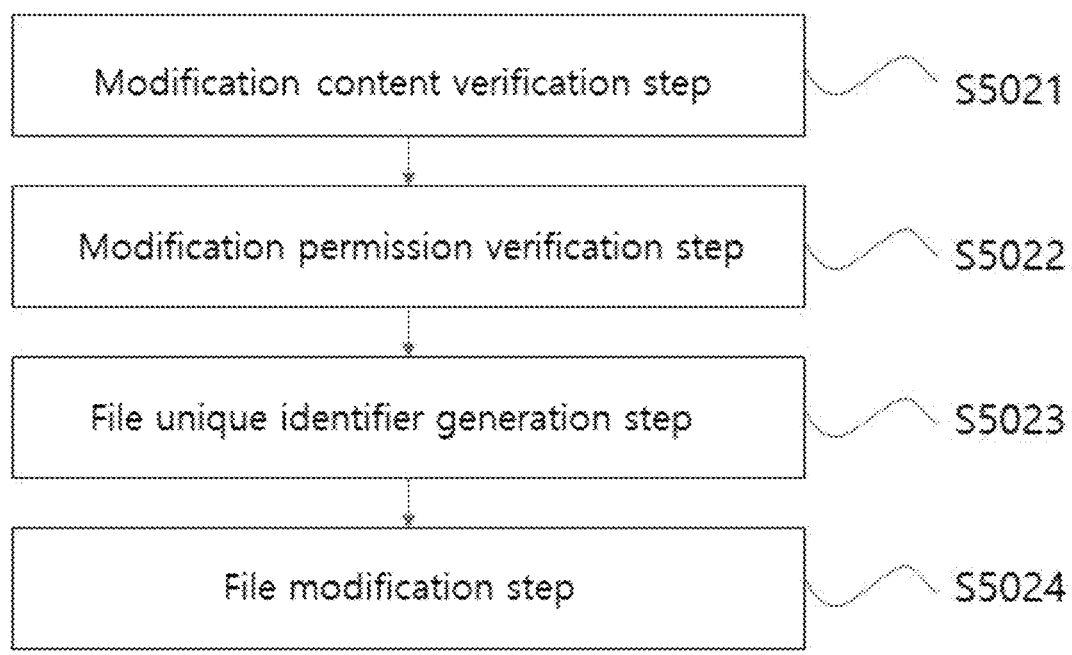
FIG. 9 is a diagram illustrating a virtual file modification step.

FIG. 9 is a diagram illustrating a virtual file modification step.

Referring to FIG. 9, a virtual file modification step (S502) may include at least one of a modification content verification step (S5021), a modification permission verification step (S5022), a file unique identifier generation step (S5023), or a file modification step (S5024).

(1) Modification Content Verification Step

In a modification content verification step (S5021), according to a request of a user (terminal) or a server, it is possible to verify what a modification content of a virtual file is.

A request to modify a virtual file of a user (terminal) or a server may be performed based on a virtual screen generated by a virtual folder screen generation step. For example, a request to modify a virtual file may be performed through various types of inputs such as a command input for modifying a virtual file or a mouse click on a generated virtual screen.

A modification of a virtual file may include copy/delete/move/change of a virtual file, modification of contents of a virtual file, and the like. Herein, changing a virtual file may include changing a name of a virtual file and changing an object identifier, a user identifier, or other data linked to a virtual file.

(2) Modification Permission Verification Step

A modification of a virtual file may be performed by a user (terminal) or a server having a read/write permission of at least one of a virtual file or a virtual folder including the virtual file. Accordingly, in a modification permission verification step (S5022), it may be verified whether a user (terminal) or a server has a read/write permission of at least one of a virtual file or a virtual folder including a virtual file.

For example, a user (terminal) or a server may read/write a virtual file when it has a read/write permission of a virtual file and a virtual folder that is a higher structure of the virtual file. Herein, a range of a higher structure may include an immediately higher structure or all higher structures.

As an example, when a user (terminal) or a server has a read/write permission of a virtual file, read/write of a virtual file may be performed regardless of a read/write permission of a virtual folder of a virtual file.

As an example, a user (terminal) or a server may read/write a virtual file when there is no limit on a read/write permission of a virtual file and a virtual folder that is a higher structure of a virtual file.

As an example, a user (terminal) or a server may read/write a virtual file when there is no limit on a read/write permission of a virtual file.

For example, a server or a specific user (terminal) may always read/write a virtual file regardless of a read/write permission of a virtual folder that is a higher structure of a virtual file. In this case, a modification permission verification step may be omitted.

A read/write permission of a virtual folder may be performed through a user identifier list of an object identifier. When a user identifier of a user (terminal) or a server is included in a user identifier list of an object identifier of a virtual folder, the user (terminal) or the server may have a read/write permission of a virtual folder. Specific details have been described above, and will be omitted below.

A read/write permission of a virtual file may be performed through a user identifier list of a file unique identifier. When a user identifier of a user (terminal) or a server is included in a user identifier list of a file unique identifier of a virtual file, the user (terminal) or the server may have a read/write permission of a virtual file. Specific details have been described above, and will be omitted below.

(3) File Unique Identifier Generation Step

In a file unique identifier generation step (S5023), it is possible to verify whether a new file unique identifier is generated according to a modification content of a virtual file, and to generate a new file unique identifier according to the verification result.

When a modification content of a virtual file is not a deletion of a virtual file and there is a permission to modify a virtual file, it is possible to check whether a new unique file identifier is generated.

When a modification content of a virtual file is a deletion of a virtual file, since there is no object to which a file unique identifier is assigned, it may not be necessary to check whether a new file unique identifier is generated.

As a result of checking whether a new file unique identifier is generated, if a new file unique identifier is generated, a new file unique identifier may be generated differently from a previous file unique identifier.

As a result of checking whether a new file unique identifier is generated, if a new file unique identifier is not generated, a new file unique identifier may not be generated.

(4) File Modification Step

In the file modification step (S5024), when a new file unique identifier is generated, a previous virtual file may be left as it is, and a real file having a new file unique identifier may be generated.

In this case, an existing virtual file may also be modified to have a new unique file identifier. When an existing virtual file is modified to have a new file unique identifier, another virtual file linked by a previous file unique identifier may selectively be modified to have a new file unique identifier.

If a new unique file identifier has not been generated, a virtual file may be modified according to a modification content. In this case, at least one of a real file having the same unique file identifier linked to a virtual file to be modified or another virtual file linked to the same file unique identifier linked to a virtual file to be modified may be modified as well.

3) Virtual Folder Modification Step

Figure 10:
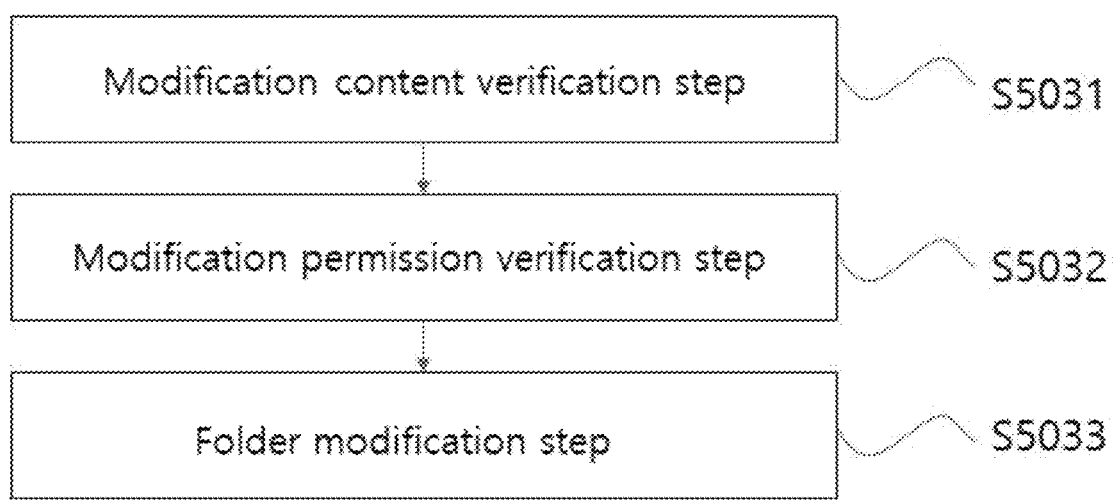
FIG. 10 is a diagram illustrating a virtual folder modification step.

FIG. 10 is a diagram illustrating a virtual folder modification step.

Referring to FIG. 10, a virtual folder modification step (S503) may include at least one of a modification content verification step (S5031), a modification permission verification step (S5032), or a folder modification step (S5033).

(1) Modification Content Verification Step

In a modification content verification step (S5031), according to a request of a user (terminal) or a server, it is possible to verify what a modification content of a virtual folder is.

A request to modify a virtual folder of a user (terminal) or a server includes a request to modify a virtual folder and a request to modify a virtual file.

The former request to modify the virtual folder may be performed based on a virtual screen generated by a virtual folder screen generation step. For example, a request to modify a virtual folder may be performed through various types of inputs such as a command input for modifying a virtual folder or a mouse click on a generated virtual screen.

The latter request to modify the virtual folder may refer to a case in which a request to modify a virtual folder of a higher structure including the virtual file is accompanied when there is the request to modify the virtual file described above. Herein, a range of a higher structure may include an immediately higher structure or all higher structures.

A modification of a virtual folder may include delete/move/copy/change of a virtual folder, modification of a virtual file in a virtual folder, and the like. Herein, changing a virtual folder may include changing a virtual folder name, modifying an object identifier, user identifier, or other data linked to the virtual folder.

(2) Modification Permission Verification Step

In a modification permission verification step (S5032), a modification of a virtual folder may be performed by a user (terminal) or a server having a read/write permission of a virtual folder. Therefore, it is possible to verify whether a user (terminal) or a server has a read/write permission of a virtual folder.

As an example, a user (terminal) or a server having a read/write permission of a virtual folder may read/write a virtual folder.

As an example, when there is no limit on a read/write permission of a virtual folder, a user (terminal) or a server may read/write a virtual folder regardless of a read/write permission of a virtual folder.

A server may always read/write a virtual folder regardless of a read/write permission of a virtual folder. In this case, a modification permission verification step may be omitted.

A read/write permission of a virtual folder may be performed through a user identifier list of an object identifier. When a user identifier of a user (terminal) or a server is included in a user identifier list of an object identifier of a virtual folder, the user (terminal) or the server may have a read/write permission of a virtual folder. Specific details have been described above, and will be omitted below.

(3) Folder Modification Step

In a folder modification step (S5033), when reading/writing of a virtual folder can be performed, a virtual folder may be modified according to a modification content. In other words, it is possible to delete/move/copy/change a virtual folder according to a modification content of a virtual folder. Herein, changing a virtual folder may include changing a name of a virtual folder and changing an object identifier, a user identifier, or other data linked to a virtual folder.

3. Virtual File Management Apparatus.

Figure 11:
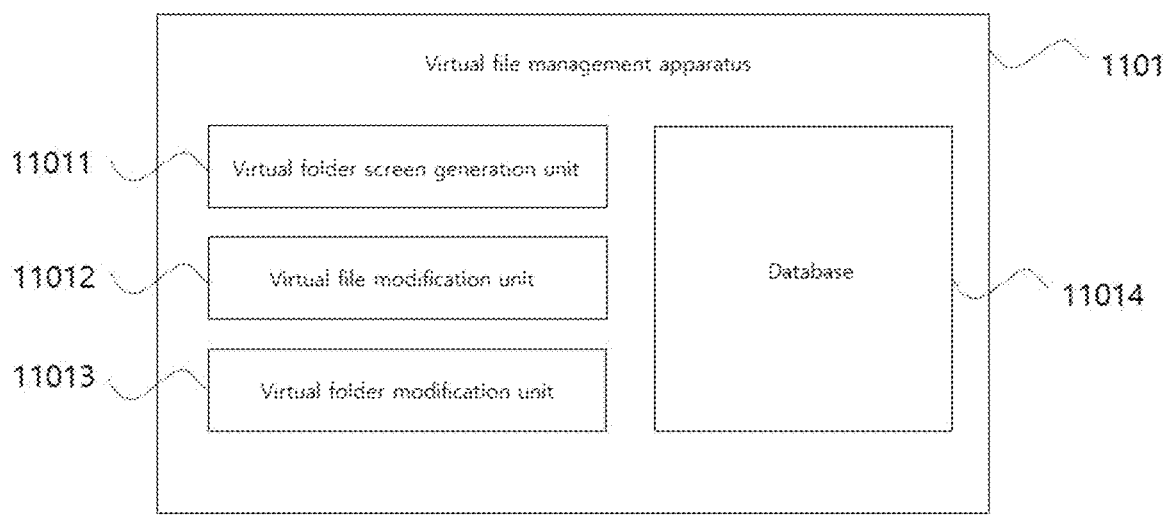
FIG. 11 is a diagram showing a virtual file management apparatus.

FIG. 11 is a diagram showing a virtual file management apparatus.

Referring to FIG. 11, a virtual file management apparatus (1101) may include at least one of a virtual folder screen generation unit (11011), a virtual file modification unit (11012), a virtual folder modification unit (11013), or a database (11014).

1) Virtual Folder Screen Generation Unit

A virtual folder screen generation unit (11011) may include at least one of a user identifier obtaining unit, an object identifier obtaining unit, an object obtaining unit, a screen generation unit, or a database connection unit.

(1) User Identifier Obtaining Unit

A user identifier obtaining unit may obtain a user identifier by receiving user identifier information from a user (terminal) or a server. User identifier information may be a user identifier or information necessary to obtain a user identifier from a database. In the latter case, a user identifier obtaining unit may obtain a user identifier from a database using user identifier information and a query through a database connection unit.

(2) Object Identifier Obtaining Unit

An object identifier obtaining unit may receive a user identifier from a user identifier obtaining unit, and may obtain an object identifier from a database by using the user identifier and a query through a database connection unit. Specifically, when a user identifier included in a user identifier list of an object identifier and an obtained user identifier are compared and the same, the object identifier may be obtained.

(3) Object Obtaining Unit

An object (virtual folder or virtual file) obtaining unit may receive an object identifier from an object identifier obtaining unit, and may obtain an object from a database by using the object identifier and a query through a database connection unit. Specifically, when an object identifier of an object (virtual folder or virtual file) and an obtained object identifier are compared and the same, the corresponding virtual folder or virtual file may be obtained.

(4) Screen Generation Unit

A screen generation unit may receive at least one object (virtual folder or virtual file) from an object obtaining unit, and generate a screen of the virtual folder according to a screen setting.

A screen of a virtual folder may be different depending on a screen setting.

A screen setting may include a number limit, the number displayed on one page, a shape, a type, a display format, a structure (or layer), etc. of at least one of a virtual folder or a virtual file.

For a screen of a virtual folder, there may be a case where it is generated in consideration of a structure (or layer) between virtual folders, and there may be case where it is not. As described above, this will be omitted.

(5) Database Connection Unit.

A database connection unit may connect each component unit of a virtual folder screen generation unit and a database. Accordingly, each component unit of a virtual folder screen generation unit may obtain information from a database or change information in a database through a database connection unit.

2) Virtual File Modification Unit

A virtual file modification unit (11012) may include at least one of a modification content verification unit, a modification authority verification unit, a file unique identifier generation unit, a file modification unit, or a database connection unit.

(1) Modification Content Verification Unit

A modification content verification unit may receive a request to modify a virtual file from a user (terminal) or a server, and may check what type of the modification request content is.

A request to modify a virtual file may be performed based on a virtual screen generated by a virtual folder screen generation unit. For example, a request to modify a virtual file may be performed through various types of inputs such as a command input for modifying a virtual file or a mouse click on a generated virtual screen.

A modification of a virtual file may include copy/delete/move/change of a virtual file, modification of contents of a virtual file, and the like. Herein, changing a virtual file may include changing a name of a virtual file and changing an object identifier, a user identifier, or other data linked to a virtual file.

(2) Modification Permission Verification Unit

A modification of a virtual file may be performed by a user (terminal) or a server having a read/write permission of at least one of a virtual file or a virtual folder including the virtual file. Accordingly, a modification permission verification unit may be verified whether a user (terminal) or a server has a read/write permission of at least one of a virtual file or a virtual folder including a virtual file.

For example, a user (terminal) or a server may read/write a virtual file when it has a read/write permission of a virtual file and a virtual folder that is a higher structure of the virtual file. Herein, a range of a higher structure may include an immediately higher structure or all higher structures.

As an example, when a user (terminal) or a server has a read/write permission of a virtual file, read/write of a virtual file may be performed regardless of a read/write permission of a virtual folder of a virtual file.

As an example, a user (terminal) or a server may read/write a virtual file when there is no limit on a read/write permission of a virtual file and a virtual folder that is a higher structure of a virtual file.

As an example, a user (terminal) or a server may read/write a virtual file when there is no limit on a read/write permission of a virtual file.

For example, a server or a specific user (terminal) may always read/write a virtual file regardless of a read/write permission of a virtual folder that is a higher structure of a virtual file. In this case, a modification permission verification step may be omitted.

A read/write permission of a virtual folder may be performed through a user identifier list of an object identifier. When a user identifier of a user (terminal) or a server is included in a user identifier list of an object identifier of a virtual folder, the user (terminal) or the server may have a read/write permission of a virtual folder. Specific details have been described above, and will be omitted below.

A read/write permission of a virtual file may be performed through a user identifier list of a file unique identifier. When a user identifier of a user (terminal) or a server is included in a user identifier list of a file unique identifier of a virtual file, the user (terminal) or the server may have a read/write permission of a virtual file. Specific details have been described above, and will be omitted below.

(3) File Unique Identifier Generation Unit

A file unique identifier generation unit may receive a modification content and a modification permission as input, may check whether a new file unique identifier is generated based on a modification content and a modification permission, and may selectively generate a new file unique identifier according to the result of checking whether the new file unique identifier is generated.

When a modification content of a virtual file is not a deletion of a virtual file and there is a permission to modify a virtual file, it is possible to check whether a new unique file identifier is generated.

When a modification content of a virtual file is a deletion of a virtual file, since there is no object to which a file unique identifier is assigned, it may not be necessary to check whether a new file unique identifier is generated.

As a result of checking whether a new file unique identifier is generated, if a new file unique identifier is generated, a new file unique identifier may be generated differently from a previous file unique identifier.

As a result of checking whether a new file unique identifier is generated, if a new file unique identifier is not generated, a new file unique identifier may not be generated.

(4) File Modification Unit

When a new file unique identifier is generated, a file modification unit may generate a real file or a virtual file having a new unique file identifier while leaving a previous virtual file as it is.

In this case, an existing virtual file may also be modified to have a new unique file identifier. When an existing virtual file is modified to have a new file unique identifier, another virtual file linked by a previous file unique identifier may selectively be modified to have a new file unique identifier.

If a new unique file identifier has not been generated, a virtual file may be modified according to a modification content. In this case, at least one of a real file having the same unique file identifier linked to a virtual file to be modified or another virtual file linked to the same file unique identifier linked to a virtual file to be modified may be modified as well.

(5) Database Connection Unit

A database connection unit may connect each component unit of a virtual file modification unit to a database. Accordingly, each component unit of a virtual file modification unit may obtain information from a database or change information in a database through a database connection unit.

A file modification unit may modify a virtual file according to a modification content when a new unique file identifier is not generated. In this case, a file having the same unique file identifier as a virtual file to be modified may also be modified.

3) Virtual Folder Modification Unit

A virtual folder modification unit (11013) may include at least one of a modification content verification unit, a modification permission verification unit, a folder modification unit, or a database connection unit.

(1) Modification Content Verification Unit

A modification content verification unit may receive a request to modify a virtual folder from a user (terminal) or a server, and may check what type of the modification request content is.

A request to modify a virtual folder of a user (terminal) or a server includes a request to modify a virtual folder and a request to modify a virtual file.

The former request to modify the virtual folder may be performed based on a virtual screen generated by a virtual folder screen generation unit. For example, a request to modify a virtual folder may be performed through various types of inputs such as a command input for modifying a virtual folder or a mouse click on a generated virtual screen.

The latter request to modify the virtual folder may refer to a case in which a request to modify a virtual folder of a higher structure including the virtual file is accompanied when there is the request to modify the virtual file described above. Herein, a range of a higher structure may include an immediately higher structure or all higher structures.

A modification of a virtual folder may include delete/move/copy/change of a virtual folder, modification of a virtual file in a virtual folder, and the like. Herein, changing a virtual folder may include changing a virtual folder name, modifying an object identifier, user identifier, or other data linked to the virtual folder.

(2) Modification Permission Verification Unit

Modification of a virtual folder may be performed by a user (terminal) or a server having a read/write permission of a virtual folder. Accordingly, a modification permission verification unit may check whether a user (terminal) or a server has a read/write permission of a virtual folder.

As an example, a user (terminal) or a server having a read/write permission of a virtual folder may read/write a virtual folder.

As an example, when there is no limit on a read/write permission of a virtual folder, a user (terminal) or a server may read/write a virtual folder regardless of a read/write permission of a virtual folder.

A server may always read/write a virtual folder regardless of a read/write permission of a virtual folder. In this case, a modification permission verification step may be omitted.

A read/write permission of a virtual folder may be performed through a user identifier list of an object identifier. When a user identifier of a user (terminal) or a server is included in a user identifier list of an object identifier of a virtual folder, the user (terminal) or the server may have a read/write permission of a virtual folder. Specific details have been described above, and will be omitted below.

(3) Folder Modification Unit

When reading/writing of a virtual folder can be performed, a folder modification unit may modify a virtual folder according to a modification content. In other words, it is possible to delete/move/copy/change a virtual folder according to a modification content of a virtual folder. Herein, changing a virtual folder may include changing a name of a virtual folder and changing an object identifier, a user identifier, or other data linked to a virtual folder.

(4) Database Connection Unit

A database connection unit may connect each component unit of a virtual folder modification unit and a database. Accordingly, each component unit of a virtual folder modification unit may obtain information from a database or change information in a database through a database connection unit.

4. Computer-Readable Recording Medium

A virtual file management method according to an embodiment of the present disclosure may be implemented as a computer-readable recording medium including program instructions for performing operations implemented in various computers. The computer-readable recording medium may include program instructions, local data files, local data structures, and the like alone or in combination. The recording medium may be specially designed and configured for the embodiment of the present disclosure, or may be known and used by a person skilled in the art of computer software. In examples of a computer-readable recording medium, magnetic media such as hard disks, floppy disks and magnetic tapes, optical recording media such as CD-ROMs and DVDs, magneto-optical media such as floptical disks, and hardware devices specifically configured to store and execute program instructions such as ROMs, RAMS and flash memories, etc. are included. The recording medium may be a transmission medium such as an optical or metal wire and a waveguide including a carrier wave for transmitting a signal designating a program command, a local data structure, and the like. In examples of program instructions may include not only machine language codes such as those generated by a compiler, but also high-level language codes that can be executed by a computer using an interpreter or the like.

The above description is merely illustrative of the technical idea of the present disclosure, and various modifications and variations are possible without departing from essential characteristics of the present disclosure by those of ordinary skill in the art to which the present disclosure belongs. In addition, the embodiments disclosed in the present disclosure are for explanation rather than limiting the technical idea of the present disclosure, and the scope of the technical idea of the present disclosure is not limited by these embodiments. Therefore, the protection scope of the present disclosure should be construed by the following claims, and all technical ideas within the scope equivalent thereto should be construed as being included in the scope of the present disclosure.

The invention claimed is:

1. A method of managing a virtual file, which is performed by a virtual file management apparatus, the method comprising:
   obtaining, with a user identifier obtaining unit of the virtual file management apparatus, a first user identifier specifying a terminal or a server;
   obtaining, with an object identifier obtaining unit of the virtual file management apparatus, a first object identifier based on whether a user identifier identical to the first user identifier is included in a user identifier list of the first object identifier specifying a first object among a plurality of objects, the plurality of objects including at least one of a virtual file or a virtual folder;
   obtaining, with an object obtaining unit of the virtual file management apparatus, the first object based on the first user identifier and the first object identifier; and
   modifying, with an object modifying unit of the virtual file management apparatus, the first object based on a modification request for the first object,
   wherein the first object identifier is a virtual path of the first object having the first object identifier,
   wherein, when a second object that is a higher structure of the first object is on the virtual path of the first object, the first object is obtained by further based on whether the user identifier identical to the first user identifier is included in a user identifier list of a second object identifier of the second object, and
   wherein, when the second object that is the higher structure of the first object is on the virtual path of the first object, the first object is modified based on a modification right of the first object and a modification right of the second object.

2. The method of claim 1,
   wherein, when the second object that is the higher structure of the first object having the first object identifier does not exist, the virtual path is a name of the first object having the first object identifier.

3. The method of claim 1,
   wherein, when there is the second object that is the higher structure of the first object having the first object identifier, the virtual path includes a name of the first object having the first object identifier, a name of the second object, and a relationship between the first object having the first object identifier and the second object.

4. The method of claim 1,
   wherein the method further comprises generating, with a screen generating unit of the virtual file management apparatus, a virtual folder screen based on the first object.

5. An apparatus for managing a virtual file, the apparatus comprising:
   a user identifier obtaining unit for obtaining a first user identifier specifying a terminal or a server;
   an object identifier obtaining unit for obtaining a first object identifier based on whether a user identifier identical to the first user identifier is included in a user identifier list of the first object identifier specifying a first object among a plurality of objects, the plurality of objects including at least one of a virtual file or a virtual folder;
   an object obtaining unit for obtaining the first object based on the first user identifier and the first object identifier; and
   an object modifying unit for modifying the first object based on a modification request for the first object,
   wherein the first object identifier is a virtual path of the first object having the first object identifier,
   wherein, when a second object that is a higher structure of the first object is on the virtual path of the first object, the first object is obtained by further based on whether the user identifier identical to the first user identifier is included in a user identifier list of a second object identifier of the second object, and
   wherein, when the second object that is the higher structure of the first object is on the virtual path of the first object, the first object is modified based on a modification right of the first object and a modification right of the second object.

6. The apparatus of claim 5,
   wherein, when the second object that is a higher structure of the first object having the first object identifier does not exist, the virtual path is a name of the first object having the first object identifier.

7. The apparatus of claim 5,
   wherein, when there is the second object that is a higher structure of the first object having the first object identifier, the virtual path includes a name of the first object having the first object identifier, a name of the second object, and a relationship between the first object having the first object identifier and the second object.

8. The apparatus of claim 5,
   wherein the apparatus further comprises a screen generating unit for generating a virtual folder screen based on the first object.

9. A computer-readable recording medium storing a computer program for executing the method of claim 1 on a computer.

10. The method of claim 1,
    wherein, when the modification request for the first object does not generate a second file unique identifier different from a first file unique identifier of a first real file connected to the first object identifier, the first object is modified according to the modification request for the first object, and a third object connected to the first file unique identifier is also modified in an identical way to the first object.

11. The method of claim 1,
wherein, when the modification request for the first object generates a second file unique identifier different from a first file unique identifier of a first real file connected to the first object identifier, the first object is not modified, and a second real file having the second file unique identifier is generated.

12. The apparatus of claim 5,
wherein, when the modification request for the first object does not generate a second file unique identifier different from a first file unique identifier of a first real file connected to the first object identifier, the first object is modified according to the modification request for the first object, and a third object connected to the first file unique identifier is also modified in an identical way to the first object.

13. The apparatus of claim 5,
wherein, when the modification request for the first object generates a second file unique identifier different from a first file unique identifier of a first real file connected to the first object identifier, the first object is not modified, and a second real file having the second file unique identifier is generated.

\* \* \* \* \*